United States Patent
Furutani et al.

(10) Patent No.: US 12,221,044 B2
(45) Date of Patent: Feb. 11, 2025

(54) FRONT STRUCTURE OF VEHICLE

(71) Applicant: MAZDA MOTOR CORPORATION, Hiroshima (JP)

(72) Inventors: Masayuki Furutani, Hiroshima (JP); Ryo Ando, Hiroshima (JP); Reiko Yoshiura, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 286 days.

(21) Appl. No.: 17/929,230

(22) Filed: Sep. 1, 2022

(65) Prior Publication Data

US 2023/0133324 A1 May 4, 2023

(30) Foreign Application Priority Data

Nov. 2, 2021 (JP) .................. 2021-179505

(51) Int. Cl.
*B60R 19/34* (2006.01)
*B60R 19/02* (2006.01)
*B60R 19/18* (2006.01)

(52) U.S. Cl.
CPC ............ *B60R 19/34* (2013.01); *B60R 19/023* (2013.01); *B60R 2019/1806* (2013.01); *B60R 2019/186* (2013.01)

(58) Field of Classification Search
CPC ......... B60R 19/34; B60R 21/34; B60R 19/03; B60R 19/023; B60R 19/12; B60R 19/18; B60R 2019/1806; B60R 2019/186; B60R 2019/1866
See application file for complete search history.

(56) References Cited

U.S. PATENT DOCUMENTS

2010/0102577 A1* 4/2010 Ginja ................ B60R 19/34
296/187.09
2016/0280164 A1* 9/2016 Hammer ............ B60R 19/18

FOREIGN PATENT DOCUMENTS

EP        1800960 A2 *  6/2007  ............ B60R 19/12
JP     2008-265399 A    11/2008

* cited by examiner

*Primary Examiner* — Daniel J Colilla
(74) *Attorney, Agent, or Firm* — Studebaker & Brackett PC

(57) ABSTRACT

A vehicle front structure comprises a beam member and a plate member. The plate member comprises a vertical face portion, a body portion extending forwardly from the vertical face portion, a front end portion positioned at a front end of the body portion, and a protrusion face portion provided to be forwardly spaced apart from the vertical face portion. The front end portion comprises an upper section located at a higher level than the body portion. The protrusion face portion comprises a protrusion-face-portion upper section located at a higher level than an upper end of the upper section and a protrusion-face-portion lower section located at a lower level than the upper end of the upper section. The protrusion-face-portion lower section is configured to have lower strength against a collision load applied from a vehicle forward side than the protrusion-face-portion upper section.

18 Claims, 13 Drawing Sheets

FRONT STRUCTURE OF VEHICLE

BACKGROUND OF THE INVENTION

The present invention relates to a front structure of a vehicle, and specifically relates to the front structure of the vehicle which comprises a beam member positioned in front of a sub frame and having a closed-cross section extending in a vehicle width direction and a plate member extending forwardly from the beam member.

Conventionally, the following structure is known as the front structure of the vehicle. That is, the structure, in which a pair of right-and-left extension members are provided in front of a sub frame (suspension cross member), a metal-plate-made beam member is attached to respective front portions of the right-and-left extension members via respective lower-side crash cans, and a plate member (a so-called foot sweeping member) like a lower stiffener is provided in front of the beam member, is known.

In this conventional front structure of the vehicle, generation of an appropriate reaction force and performance of energy absorption can be compatibly attained through deformation of the plate member and deflection of the metal-plate-made beam member in a vehicle collision against a pedestrian and also unexpected damage for vehicle parts, such as a cooling member, can be suppressed even in a case of a light vehicle collision.

However, this conventional vehicle structure has a problem that a section of the structure which corresponds to the lower-side crash cans may cause damage to a counter vehicle if this structure is applied to a MPDB collision test which is supposed to be introduced in the near feature. The MPDB collision test is a collision test using a Mobile Progressive deformable Barrier (i.e., a front-movable type of deformable barrier) for evaluating injuriousness to the counter vehicle.

Herein, it may be considered that the high-rigidity beam member having the closed-cross section is used in place of the conventional metal-plate-made beam member and also a resin-made plate member, which is disclosed in Japanese Patent Laid-Open Publication No. 2008-265399, for example, is used as the above-described plate member.

In this case, when the vehicle has the light collision, the crushed plate member stays at a lower part of the beam member and the beam member rotates around a width-directional axis, without being deformed, so that the lower-side crash cans come to be bent/deformed without being axially compressed.

Consequently, there may occur an unexpected contact with surrounding vehicle parts, such as the cooling member. Further, in terms of protection of the pedestrian, since the high-rigidity beam member is not deformed properly, the reaction force may become too high, so that the damage degree may be improperly increased.

SUMMARY OF THE INVENTION

Accordingly, an object of the present invention is to provide a front structure of a vehicle which can compatibly attain the pedestrian-protection performance and the vehicle-parts damage suppression in the vehicle light collision even if the plate member is applied to the beam member having the closed-cross section.

The present invention is the front structure of the vehicle which comprises a beam member positioned in front of a sub frame and having a closed-cross section extending in a vehicle width direction, and a plate member extending forwardly from the beam member, wherein the plate member comprises a vertical face portion provided along a front face portion of the beam member, a body portion extending forwardly from the vertical face portion, a front end portion positioned at a front end of the body portion and configured to have higher rigidity against the load applied in the longitudinal direction than the body portion, and a protrusion face portion provided to be forwardly spaced apart from the vertical face portion, the front end portion of the plate member comprises a front-end-portion upper section located at a higher level than the body portion, the protrusion face portion comprises a protrusion-face-portion upper section located at a higher level than an upper end of the front-end-portion upper section and a protrusion-face-portion lower section located at a lower level than the upper end of the front-end-portion upper section, and the protrusion-face-portion lower section is configured to have lower strength against a collision load applied from a vehicle forward side than the protrusion-face-portion upper section.

According to the present invention, even if the vehicle collides against the pedestrian from any direction, the front end portion of the plate member transmits a collision load to the body portion so as to allow the body portion to be deformed with a constant load. Thereby, an appropriate reaction force can be generated.

Further, in a vehicle frontal collision, even if the front end portion is retreated by the rearward load and the protrusion-face-portion lower section remains uncrushed partially, since the protrusion-face-portion lower section is configured to have the lower strength against the collision load applied from the vehicle forward side than the protrusion-face-portion upper section, the protrusion-face-portion lower section can be deformed rearwardly. Consequently, a front face of the beam member is moved back just straightly because of an uncrushed-remaining structure of the front end portion which is created between the protrusion-face-portion upper section of the protrusion face portion protruding forwardly and the protrusion-face-portion lower section deformed rearwardly, so that the beam member can be suppressed from being rotated. That is, even if the plate member is applied to the beam member having the closed-cross section, the pedestrian-protection performance and the vehicle-parts damage suppression in the vehicle light collision can be compatibly attained.

As an embodiment of the present invention, the protrusion face portion of the plate member may be provided at a part of the vertical face portion and comprise an upper wall and right-and-left side walls such that the protrusion face portion is formed in a boxy shape, and a high-rigidity portion may be provided in an upper area of the boxy shape and a lower area of the boxy shape is configured to be a hollow.

The high-rigidity portion may be configured to be a vertical rib extending in a vertical direction and any other high-rigidity portion, such as a lateral or slant rib, is applicable as long as it is a means for improving the rigidity. According to this embodiment, a structure in which the protrusion-face-portion lower section has the lower strength against the collision load applied from the vehicle forward side than the protrusion-face-portion upper section can be materialized with a simple structure.

As another embodiment of the present invention, a lower-side crash can which is connected to the beam member may be provided in front of the sub frame, the beam member may comprise a central portion which is positioned at a central side, in the vehicle width direction, of the beam member and extends in the vehicle width direction and both-end portions which extend obliquely outwardly-and-rearwardly from right-and-left both ends of the central portion in a plan view, and the protrusion face portion of the plate member may be provided between a border portion between the central portion and each of the both-end portions of the beam member and a position of an inward-side end portion, in the vehicle width direction, of the lower-side crash can.

According to this embodiment, since the protrusion face portion hits against the barrier earlier than the vertical face portion when the barrier intrudes, crushing control can be properly attained.

As another embodiment of the present invention, the boxy shape of the protrusion face portion may be configured such that a center, in the vehicle width direction, thereof protrudes forwardly.

According to this embodiment, a forwardly-protrusion portion of the boxy shape hits against the barrier first, so that a front face of the protrusion face portion can be crushed substantially uniformly.

As another embodiment of the present invention, the front end portion of the plate member may comprise the front-end-portion upper section located at the higher level than the body portion and a front-end-portion lower section which is located at a lower level than the body portion, and the front-end-portion upper section may be positioned on the vehicle forward side of the front-end-portion lower section and protrude highly relative to the body portion.

According to this embodiment, an upper end of the front end portion can be rotated such that its rear side is moved more downwardly in the vehicle frontal collision, so that the body portion is so deflected downwardly that the part of the front end portion which remains uncrushed can be moved below the vertical face portion.

As another embodiment of the present invention, a rib which connects a front end of the front end portion and the body portion of the plate member may be provided.

According to this embodiment, the front end portion can be made to have the high rigidity with a simple structure.

Thus, according to the present invention, the pedestrian-protection performance and the vehicle-parts damage suppression in the vehicle light collision can be compatibly attained even if the plate member is applied to the beam member having the closed-cross section.

The present invention will become apparent from the following description which refers to the accompanying drawings.

DETAILED DESCRIPTION OF THE INVENTION

Figure 2:
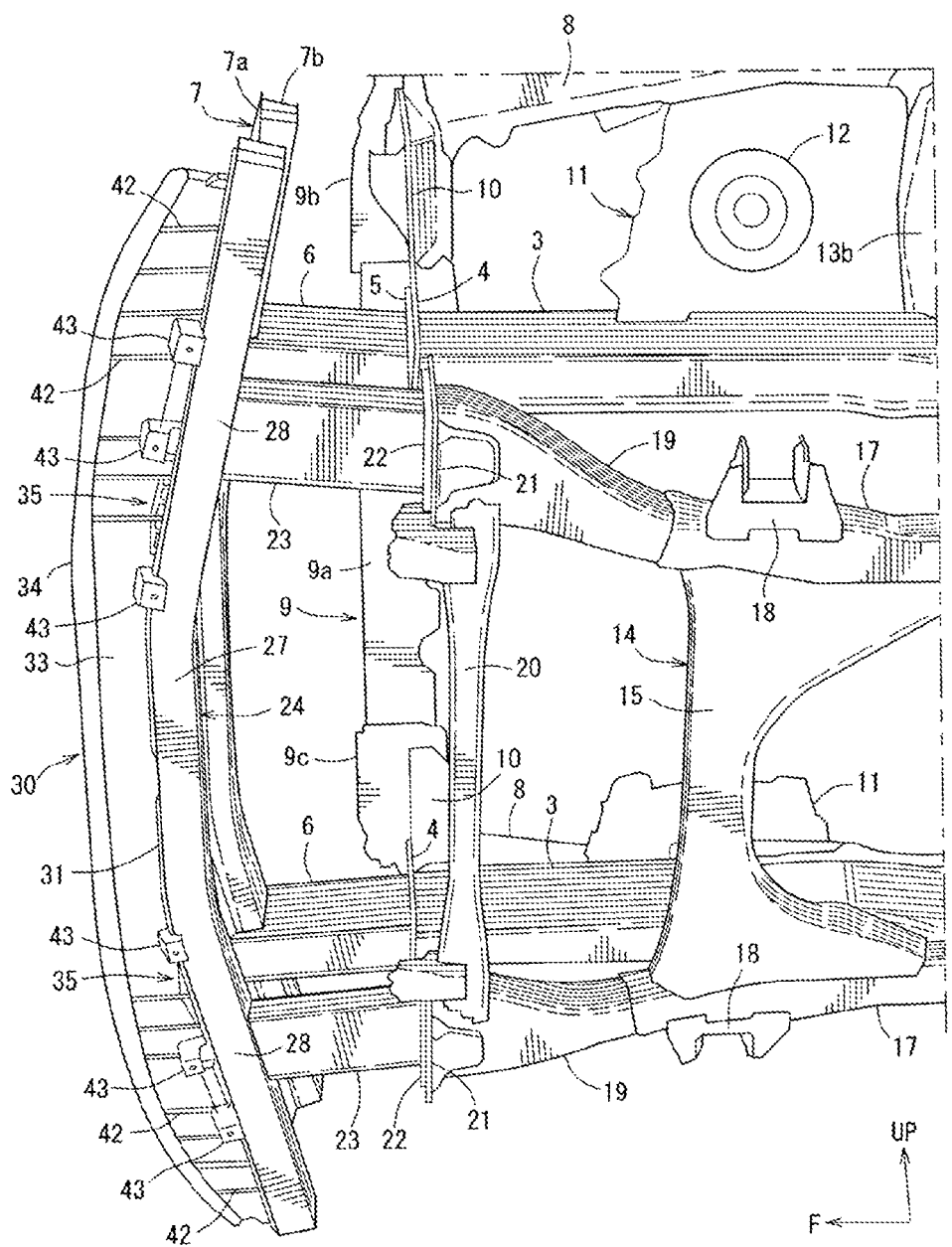
FIG. 2 is a lower-face perspective view showing the front structure of the vehicle.
Figure 3:
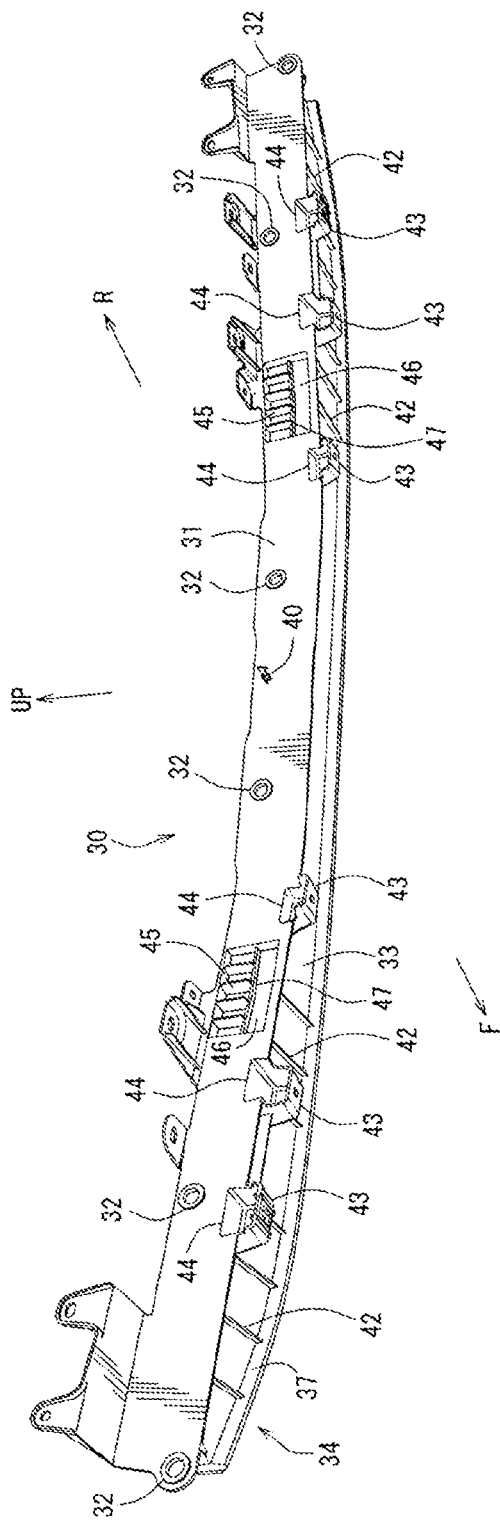
FIG. 3 is a perspective view showing a plate member, when viewed from a rearward-and-downward side of the vehicle.

An embodiment of the present invention will be described specifically referring to the drawings. The drawings show a front structure of a vehicle, wherein FIG. 1 is an upper-face perspective view showing the front structure of the vehicle, FIG. 2 is a lower-face perspective view showing the front structure of the vehicle, FIG. 3 is a perspective view showing a plate member, when viewed from a rearward-and-downward side of the vehicle, and FIG. 4 is a plan view showing a beam member, the plate member, and a lower-side crash can.

Figure 4:
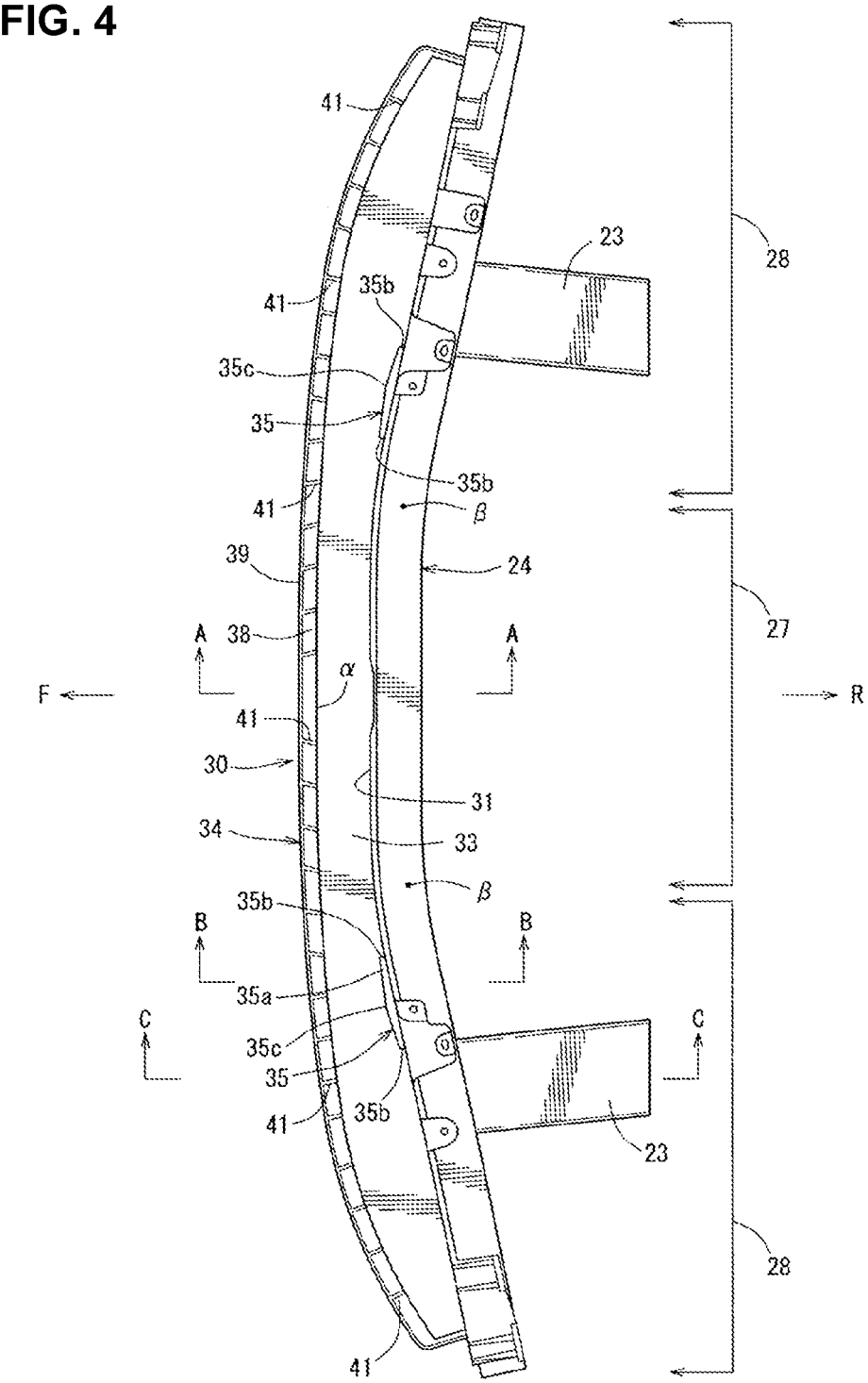
FIG. 4 is a plan view showing a beam member, the plate member, and a lower-side crash can.
Figure 5:
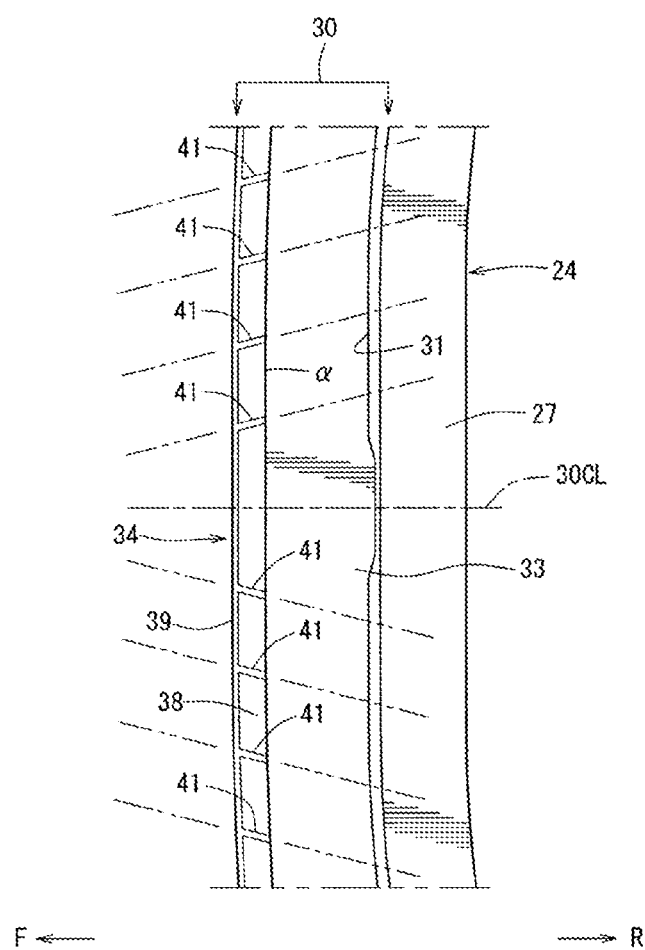
FIG. 5 is an enlarged plan view of a central portion, in a vehicle width direction, of FIG. 4.
Figure 6A:
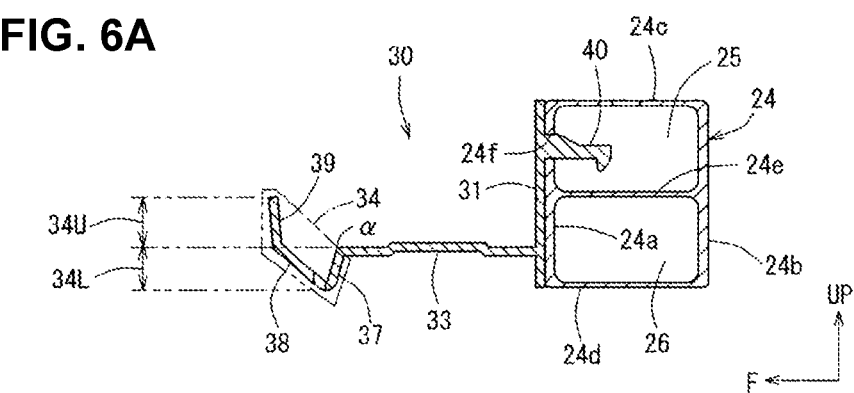
FIG. 6A is a sectional view take along line A-A of FIG. 4.
Figure 6B:
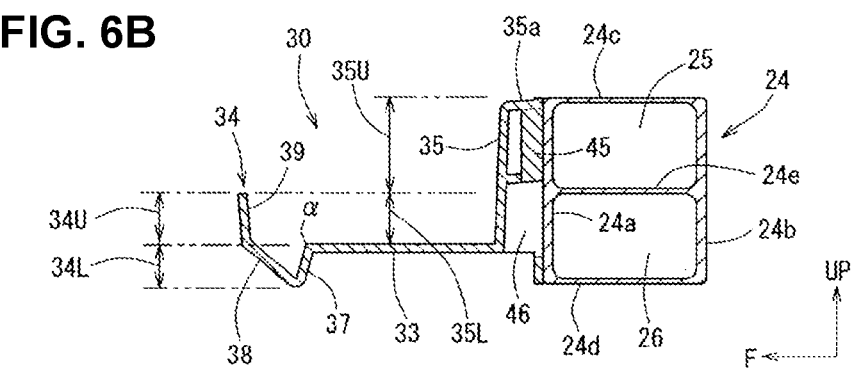
FIG. 6B is a sectional view take along line B-B of FIG. 4.
Figure 6C:
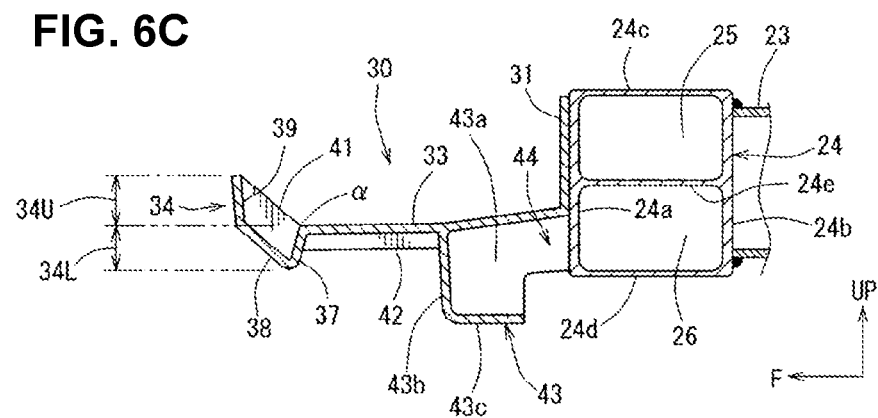
FIG. 6C is a sectional view take along line C-C of FIG. 4.
Figure 7:
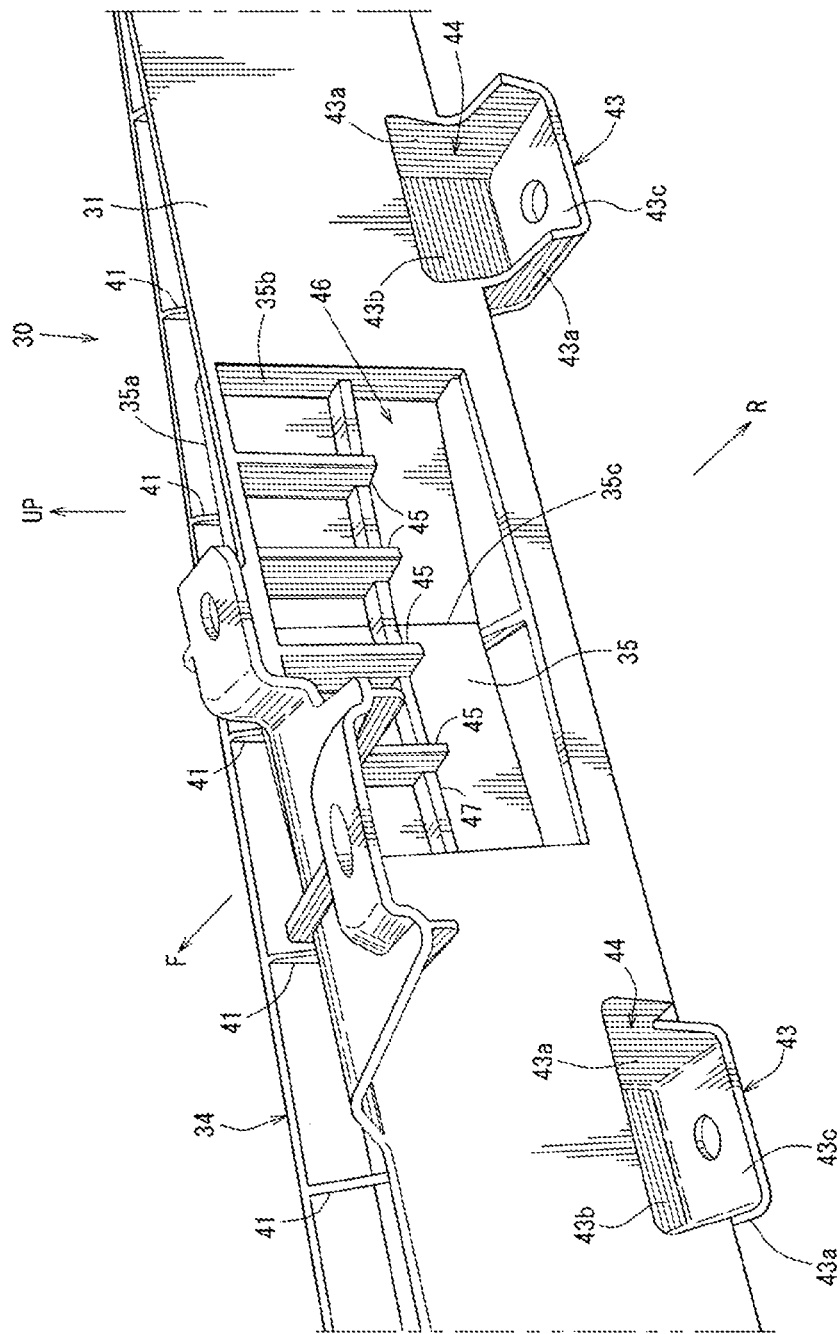
FIG. 7 is a perspective view showing a notch and a protrusion face portion.
Figure 8:
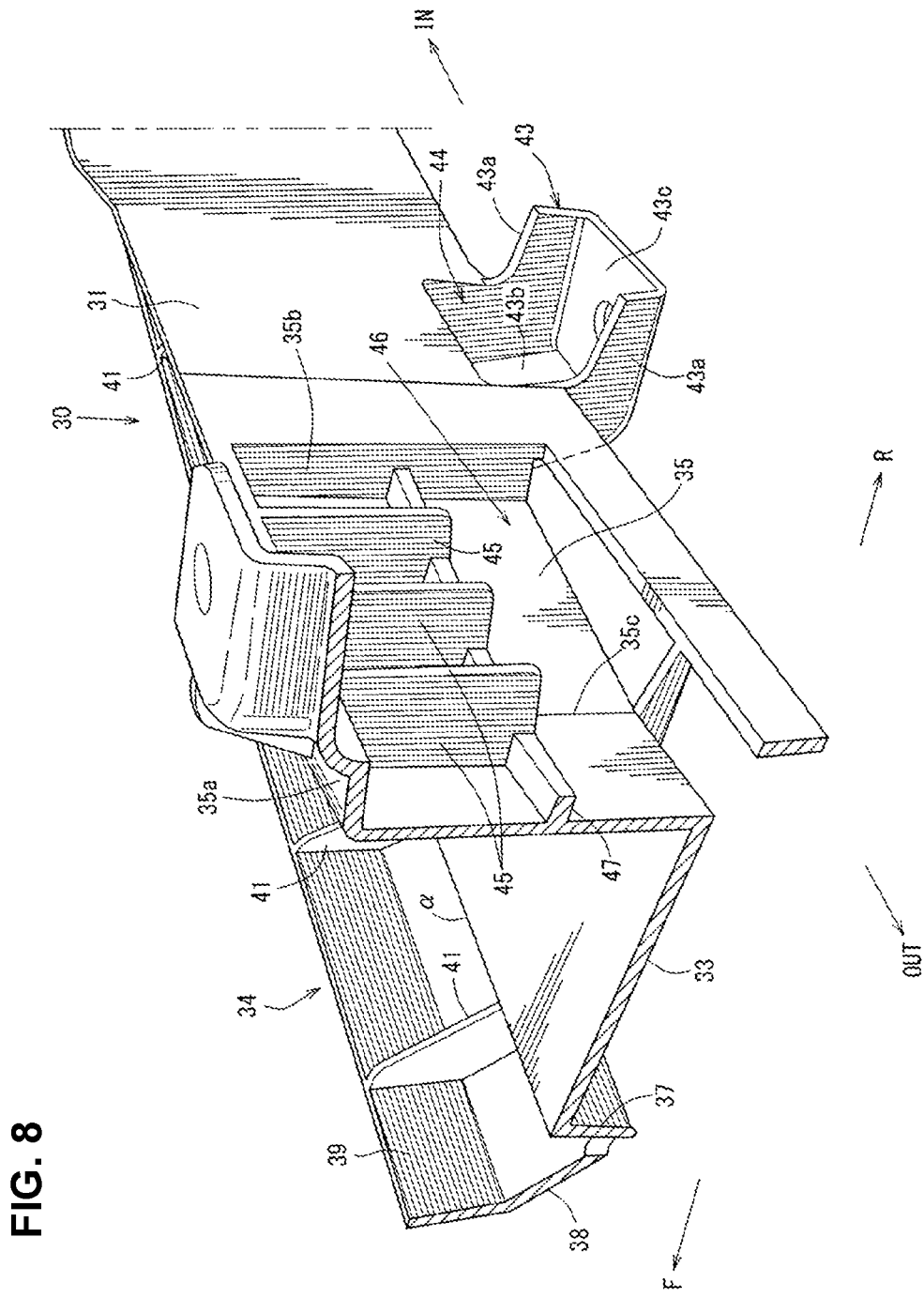
FIG. 8 is a perspective vertical-direction sectional view of a major part of FIG. 7.
Figure 9:
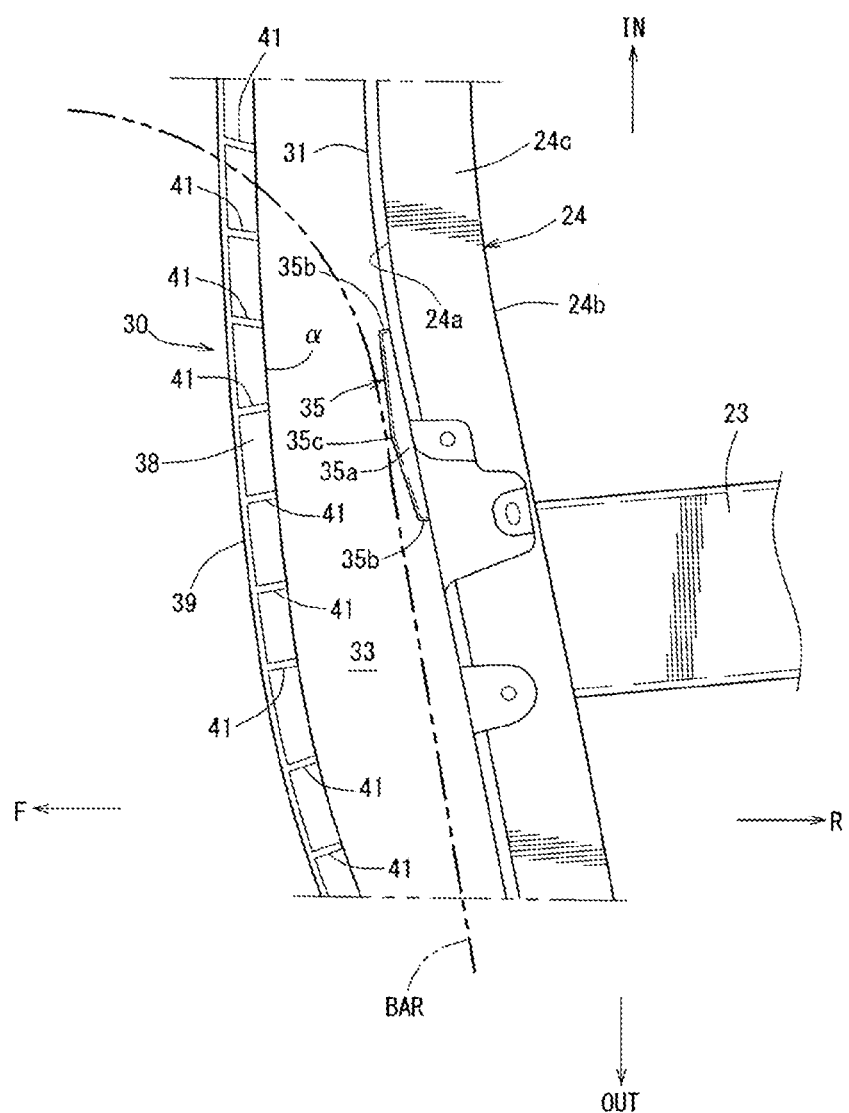
FIG. 9 is a partial plan view showing a relation between a barrier and the protrusion face portion in a predetermined collision mode.

Further, FIG. 5 is an enlarged plan view of a central portion, in a vehicle width direction, of FIG. 4, FIG. 6A is a sectional view take along line A-A of FIG. 4, FIG. 6B is a sectional view take along line B-B of FIG. 4, FIG. 6C is a sectional view take along line C-C of FIG. 4, FIG. 7 is a perspective view showing a notch and a protrusion face portion, and FIG. 8 is a perspective vertical-direction sectional view of a major part of FIG. 7. Moreover, FIG. 9 is a partial plan view showing a relation between a barrier and the protrusion face portion in a predetermined collision mode.

Figure 1:
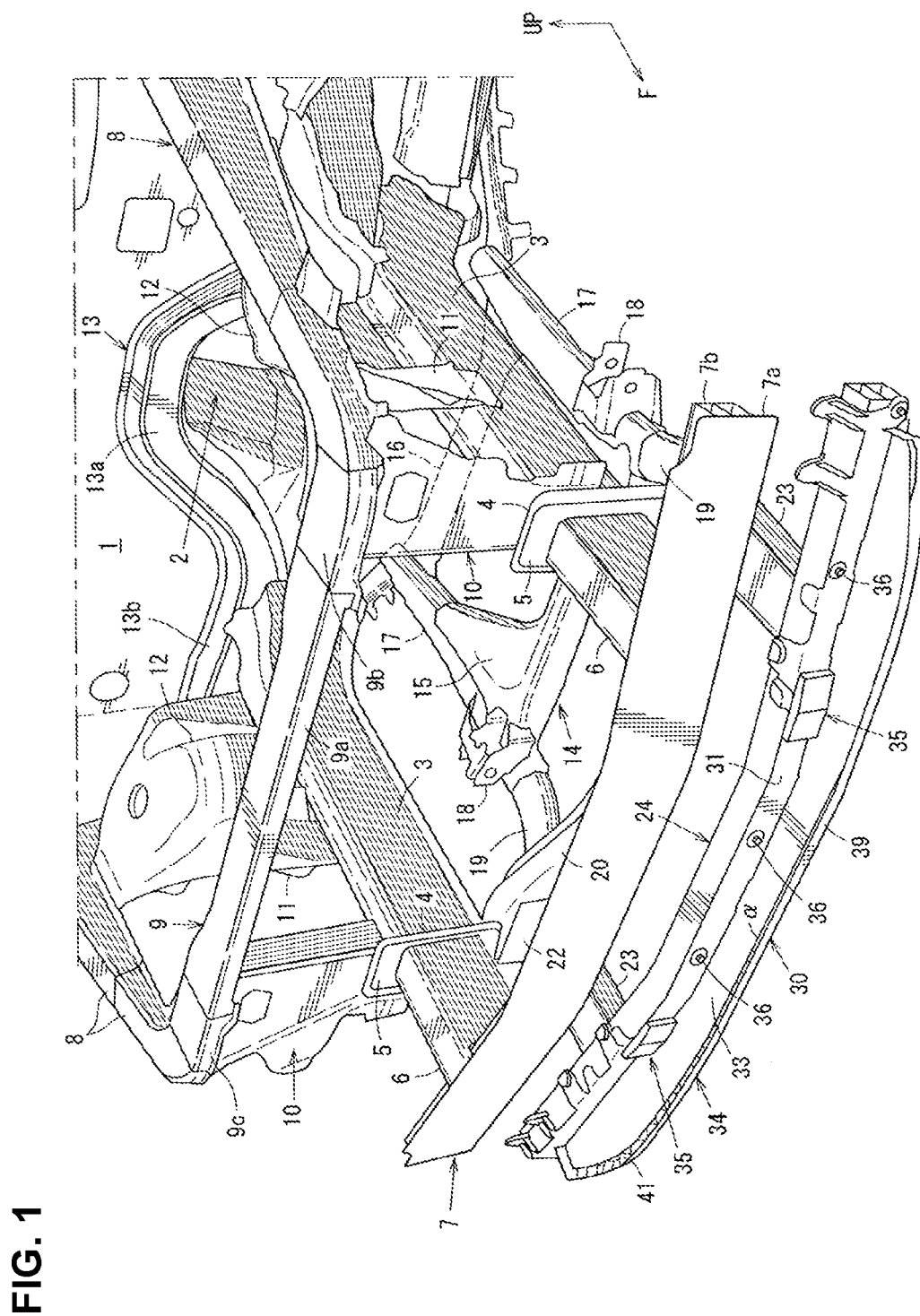
FIG. 1 is an upper-face perspective view showing a front structure of a vehicle.

As shown in FIG. 1, a dash lower panel (dash panel) 1 which partitions an engine room from a cabin in a vehicle longitudinal direction is provided, and a pair of front side frames 3 which extend forwardly from right-and-left both-side portions, in a vehicle width direction, of a tunnel portion 2 which is formed at the dash lower panel 1 are provided.

The above-described front side frame 3 is a vehicle-body rigidity member which has a front-side closed-cross section extending in the vehicle longitudinal direction which is formed by fixedly joining a front side frame inner and a front side frame outer.

An upper-side crash can 6 (collision-energy absorbing member) extending in the vehicle longitudinal direction is attached to a front end portion of the front side frame 3 via a plate-shaped set plate 4 and a plate-shaped attachment plate 5. As shown in FIGS. 1 and 2, the upper-side crash can 6 is attached to the front end portion of each of the right-and-left front side frames 3, and a bumper reinforcement 7 is attached to respective front end portions of a pair of right-and-left upper-side crash cans 6.

As shown in FIG. 1, the bumper reinforcement 7 is formed by two members of a plate-shaped bumper plate 7a which is positioned at a front side and a bumper plate 7b which has a closed-cross section structure and is positioned at a rear side, and the bumper reinforcement 7 extends in the vehicle width direction in front of the upper-side crash cans 6.

As shown in FIG. 1, an apron reinforcement 8 which extends in the vehicle longitudinal direction is provided above the front side frame 3 and on an outward side, in the vehicle width direction, of the front side frame 3. This apron reinforcement 8 is a vehicle-body strength member which has an apron-reinforcement closed-cross section extending in the vehicle longitudinal direction, a rear portion of which is connected to a hinge pillar directly or indirectly. The hinge pillar is a vehicle-body strength member which has a hinge-pillar closed-cross section extending in a vertical direction of the vehicle which is formed by fixedly joining a hinge pillar inner and a hinge pillar outer.

As shown in FIG. 1, a shroud upper panel 9 is provided to interconnect respective front end portions of the pair of right-and-left apron reinforcements 8, 8 in the vehicle width direction. In the present embodiment, the shroud upper panel 9 is formed by three members of a shroud-upper central portion 9a which is positioned at a center, in the vehicle width direction, thereof and shroud-upper side portions 9b, 9c which are positioned at right-and-left both sides, in the vehicle width direction, thereof.

Further, as shown in FIGS. 1 and 2, there is provided a connecting member 10 which connects in the vertical direction a front portion of the front side frame 3 which is located at a lower side, and the shroud upper panel 9 and the apron reinforcement 8 which are located at an upper side.

Moreover, as shown in FIGS. 1 and 2, there is provided a suspension housing 11 which connects in the vertical direction the apron reinforcement 8 which is located at the upper side and the front side frame 3 which is located at the lower side. This suspension housing 11 comprises a front-suspension tower portion 12.

Meanwhile, as shown in FIG. 1, a dash-lower reinforcing member 13 is fixedly joined to a front portion of the dash lower panel 1, and a dash-lower closed-cross section which extends in a longitudinal direction of the dash-lower reinforcing member 13 is formed between the dash-lower reinforcing member 13 and the dash lower panel 1.

The dash-lower reinforcing member 13 is formed integrally at a front end portion of the tunnel portion 2 by an arch-shaped portion 13a which is formed in an arch shape along a shape of the tunnel portion 2 and a horizontal portion 13b which nearly horizontally extends outwardly, in the vehicle width direction, from a lower end portion of the arch-shaped portion 13a.

Herein, as shown in FIGS. 1 and 2, a sub frame (suspension cross member) 14 is provided at a lower part of the engine room. The sub frame 14 is formed by a front cross member 15 as a sub-frame body, a rear cross member 16 (see FIG. 1) which is positioned on a rearward side, in the vehicle longitudinal direction, of the front cross member 15 and extends in the vehicle width direction, and right-and-left side members 17, 17 which respectively connect the front cross member 15 and the rear cross member 16 in the vehicle longitudinal direction, which are connected together in a frame shape in the plan view.

The above-described front cross member 15 is configured such that its front portion extends in the vehicle width direction and its right-and-left side portions extend in the vehicle longitudinal direction. Further, the right-and-left side members 17 extend in the vehicle longitudinal direction.

As shown in FIGS. 1 and 2, a suspension-arm support bracket 18 to support a vehicle-body-side end portion of a front suspension, not illustrated, is attached to a front portion of the side member 17. Further, as shown in the same figures, an extension member 19 which extends forwardly is provided at a front end portion of the side member 17.

The extension member 19 is formed in a hollow shape by combining an upper-split member and a lower-split member so as to have a closed-cross section therebetween, and configured such that a width, in the vehicle width direction, of a front portion of the extension member 19 is wider than that of a rear portion of the extension member 19.

The extension member 19 is provided at the front end portion of each of the pair of right-and-left side members 17, 17, a cross member 20 which extends in the vehicle width direction is provided between respective front portions of the pair of right-and-left extension members 19, 19.

As shown in FIG. 2, a lower-side crash can 23 (collision-energy absorbing member) which extends in the vehicle longitudinal direction is attached to a front end portion of each of the extension members 19, 19 via a plate-shaped set plate 21 and a plate-shaped attachment plate 22. A beam member 24 extending in the vehicle width direction (specifically, a perimeter beam) is attached to respective front end portions of a pair of right-and-left lower-side crash cans 23.

As shown in FIGS. 6A, 6B and 6C, the beam member 24 is formed such that a front wall 24a, a rear wall 24b, an upper wall 24c, and a lower wall 24d are combined together in a rectangular frame shape, a partition wall 24e which is parallel to the upper-and-lower walls 24c, 24d is formed between the front wall 24a and the rear wall 24b, whereby two closed-cross sections 25, 26 are formed. The beam member 24 can be made of an aluminum-made or aluminum-alloy-made extrusion molding member.

That is, as shown in FIG. 2, the beam member 24 is a member which is positioned in front of the sub frame 14 and has the closed-cross sections 25, 26 extending in the vehicle width direction. Further, the beam member 24 comprises, as shown in FIG. 4, a central portion 27 which is positioned at a central side, in the vehicle width direction, of the beam member 24 and extends in the vehicle width direction and both-end portions 28, 28 which are positioned on both sides, in the vehicle width direction, of the central portion 27 and configured to extend obliquely outwardly-and-rearwardly from both-side ends (see border portions β described later) of the central portion 27 in the plan view.

As shown in FIGS. 1, 2 and 6, there is provided a lower stiffener 30 as a plate member which extends forwardly from the beam member 24. This lower stiffener 30 is made of resin and configured such that its front end reaches a position close to a back face of a front bumper face (not illustrated), and this lower stiffener 30 is a so-called foot sweeping member which prevents a portion around an ankle of a pedestrian's foot from coming into a lower side of the vehicle when the vehicle contacts (collides against) a pedestrian.

As shown in FIGS. 3, 4 and 6, the lower stiffener 30 comprises a vertical face portion 31 which is provided along a front face portion of the beam member 24, plural fixation portions 32 which fix the vertical face portion 31 to the beam member 24, a body portion 33 which extends forwardly from the vertical face portion 31 including the fixation portions 32, and a front end portion 34 which is positioned at a front end of the body portion 33 and configured to have high rigidity against a load applied in the longitudinal direction than the body portion 33.

Further, as shown in the same figures, the lower stiffener 30 comprises protrusion face portions 35 which are forwardly spaced from the vertical face portion 31. As shown in FIGS. 3 and 6, the vertical face portion 31 extends in the vertical direction in a side view, and as shown in FIG. 4, the vertical face portion 31 is formed in the plan view such as it extends along a front face of the central portion 27 of the beam member 24 and front faces of the both-end portions 28, 28 of the bean member 24.

As shown in FIG. 3, the plural (six, in the present embodiment) fixation portions 32 to fix the vertical face portion 31 to the beam member 24 are provided such that they are positioned at intervals in the vehicle width direction. Herein, the number of the plural fixation portions 32 is not to be limited to six, and any number more than or less than six is applicable. The fixation portions 32 are fixed to the front face portion of the beam member 24 by using the plural fixation members 36 shown in FIG. 1.

As shown in FIGS. 6A, 6B and 6C, the body portion 33 extends forwardly from the vertical face portion 31 including the fixation portions 32 substantially perpendicularly to the vertical face portion 31. Further, as shown in the same figures, the body portion 33 is configured to have a liner shape in a vehicle side view.

As shown in FIGS. 6A, 6B and 6C, the front end portion 34 configured to have the higher rigidity against the longitudinal load than the body portion 33 comprises a rear-side inclined piece portion 37 which extends obliquely forwardly-and-downwardly from the front end of the body portion 33, a front-side inclined piece portion 38 which extends obliquely forwardly-and-upwardly from a lower end of the rear-side inclined piece portion 37, and a front piece portion 39 which extends substantially just upwardly from an upper end of the front-side inclined piece portion 38.

That is, the front end portion 34 is formed by the above-described respective piece portions 37, 38, 39 as shown by an enclosing imaginary line in FIG. 6A. Moreover, the front end portion 34 comprises, as shown in FIGS. 6A, 6B and 6C, a front-end-portion upper section 34U which is located above the body portion 33 and a front-end-portion lower section 34L which is located below the body portion 33, and the front-end-portion upper section 34U is positioned on the forward side of the front-end-portion lower section 34L.

In the present embodiment, the front-end-portion upper section 34U is formed by the front piece portion 39, and the front-end-portion lower section 34L is formed by both of the rear-side inclined piece portion 37 and the front-side inclined piece portion 38. Thereby, even if the vehicle collides against the pedestrian from any direction, the front end portion 34 transmits the load to the body portion 33 so as to allow the body portion 33 to be deformed with a constant load, so that an appropriate reaction force is generated.

Further, in the vehicle frontal collision, since a load input happens at the front-end-portion upper section 34U earlier than the front-end-portion lower section 34L, there occurs a moment to cause the upper end of the front end portion 34 to rotate such that its rear side is moved more downwardly, so that the body portion 33 is deflected downwardly. Thereby, the body portion 33 is suppressed from being crushed at the front face of the beam member 24.

That is, even if the lower stiffener 30 is applied to the beam member 24 having the closed-cross sections 25, 26, the pedestrian-protection performance and the vehicle-parts (e.g., a cooling member) damage suppression in the vehicle light collision are compatibly attained.

Moreover, as shown in FIGS. 6A, 6B and 6C, the front end portion 34 comprises the front-end-portion lower section 34L which protrudes downwardly from the front end of the body portion 33 and the front-end-portion upper section 34U which is positioned at a front end of the front-end-portion lower section 34L, specifically at a front end of the front-side inclination piece portion 38. Thereby, a border portion α between the front end of the body portion 33 and a rear end of the front-end-portion lower section 34L becomes a bending causing point where the front end portion 34 is rotated in the vehicle frontal collision.

Also, as shown in FIGS. 6A, 6B and 6C, the front end portion 34 is configured to have a forwardly-inclined shape, in a so-called forward-and-upward direction, such that its front side is located at a higher level than its rear side. Thereby, the moment to cause the upper end of the front end portion 34, specifically an upper end of the front piece portion 39, to rotate such that its rear side is moved more downwardly becomes larger, so that the downward deflection of the body portion 33 is secured.

Moreover, according to the above-described forwardly-inclined shape, a stroke of the rearward rotation of the front end portion 34 can be secured sufficiently, so that the front end portion is suppressed from interfering with the body portion 33, thereby allowing the sufficient rotation of the front end portion 34.

As shown in FIGS. 3 and 6A, a hook portion 40 to be inserted into a hole portion 24f which is formed at the front wall 24a of the beam member 24 is integrally formed at a back face of a central portion, in the vehicle width direction, of the vertical face portion 31 of the lower stiffener 30 such that it protrudes rearwardly. By inserting the hook portion 40 into the hole portion 24f, temporary attaching and positioning of the lower stiffener 30 is attained when the lower stiffener 30 is assembled to the beam member 24.

As shown in FIGS. 4, 5 and 6A-6C, there are provided ribs 41 which connect the front end of the front end portion 34 and the front end of the body portion 33. As shown in FIG. 6C, the rib 41 comprises a front piece, a rear piece, a lower piece, and an upper piece, the front piece of the rib 41 contacts a back face of the front piece portion 39, the rear piece of the rib 41 contacts a front face of the rear-side inclination piece portion 37, the lower piece of the rib 41 contacts an upper face of the front-side inclination piece portion 38, and the upper piece of the rib 41 is inclined such that its front side is located at the higher level than its rear side so as to connect the upper end of a front piece portion 39 and the front end of the body portion 33. The ribs 41 are integrally formed at the front end portion 34.

As shown in FIG. 4, the plural ribs 41 are provided at the lower stiffener 30 at intervals in the vehicle width direction with a prescribed distance between the two. Thereby, the front end portion 34 is configured to have the high rigidity with a simple structure.

Herein, the lower stiffener 30 is configured to control a reaction force to the pedestrian by means of the high-rigidity front end portion 34 which performs a function of receiving the load and the body portion 33 which performs a function of deformation.

As shown in FIG. 5 which is an enlarged view of the central portion, in the vehicle width direction, of FIG. 4, the rib 41 which is provided at a position, in the vehicle width direction, of the front end portion 34 which corresponds to the central portion 27 of the beam member 24 is configured to extend obliquely outwardly-and-rearwardly in the plan view. Herein, in FIG. 5, an obliquely-extending direction of each of the ribs 41 is illustrated by an imaginary extension line for clarification.

Thus, by configuring the rib 41 provided at the position, in the vehicle width direction, of the front end portion 34 which corresponds to the central portion 27 of the beam member 24 to extend obliquely outwardly-and-rearwardly in the plan view, the rib 41 is crushed completely. If this rib is configured to extend straightly in the longitudinal direction, the rib resists the vehicle-frontal collision load to a considerably-large extent, so that this rib may not be crushed completely, that is, part of the rib may remain uncrushed. Meanwhile, since the rib 41 of the present embodiment is inclined relative to the vehicle longitudinal direction as described above, falling down of the rib 41 is promoted, so that the rib's complete crushing is promoted.

Specifically, as shown in FIG. 5, the ribs 41 which are positioned on the right side, in the vehicle width direction, of a center line 30CL, in the vehicle width direction, of the lower stiffener 30 extend obliquely rightwardly-and-rearwardly, whereas the ribs 41 which are positioned on the left side, in the vehicle width direction, of the center line 30CL, in the vehicle width direction, of the lower stiffener 30 extend obliquely leftwardly-and-rearwardly. Thereby, the ribs 41 are configured such that the rib's complete crushing is promoted.

As shown in FIGS. 2, 3 and 6C, the body portion 33 of the lower stiffener 30 is configured to have a liner shape extending in the vehicle longitudinal direction, and lower ribs 42 which connect the vertical face portion 31 including the fixation portions 32 and the front end portion 34 are provided at a lower face of the body portion 33 of the lower stiffener 30. In the present embodiment, the plural lower ribs 42 which respectively connect the front end portion 34 and the vertical face portion 31 in the vehicle longitudinal direction are provided at intervals in the vehicle width direction at the lower face of the body portion 33 at respective positions which correspond to the both-end portions 28 of the bead member 24 in the vehicle longitudinal direction.

Herein, at a position where an under-cover attachment portion described later (see reference number 43 shown in FIGS. 7 and 8) is provided, the lower ribs 42 are provided at the lower face of the body portion 33 such that they connect the front end portion 34 and the under-cover attachment portion 43 in the vehicle longitudinal direction.

Thereby, the reaction force in the pedestrian's protection is adjusted by the lower ribs 42. Specifically, the reaction force in the pedestrian's protection can be adjusted by changing the number of the lower ribs 42 or the thickness of the lower ribs 42.

Further, since the rigidity of the body portion 33 is improved by the lower ribs 42, the body portion 33 is securely deflected downwardly without buckling or bending in the vehicle frontal collision. Further, as shown in FIG. 6C, a lower end of the lower rib 42 is located at the higher level than a lower end of the front-end-portion lower section 34L of the front end portion 34.

Thereby, the rotation of the front end portion 34 in the vehicle frontal collision is not hindered by the lower rib 42. Further, the collision reaction force in the pedestrian protection is adjusted by the lower rib 42.

The under-cover attachment portions 43 which extend downwardly are provided at the base portion (i.e., a root portion) of the body portion 33 of the lower stiffener 30 as shown in FIGS. 2 and 3. As shown in the same figures, the under-cover attachment portions 43 are provided at intervals in the vehicle width direction.

As shown in FIGS. 7 and 8, the under-cover attachment portion 43 comprises a pair of right-and-left side walls 43*a*, 43*a* which face each other in the vehicle width direction with a prescribed distance, a front wall 43*b* which interconnects respective front end portions of the right-and-left side walls 43*a* in the vehicle width direction, and a bottom wall 43*c* which interconnects respective lower end portions of the right-and-left side walls 43*a* in the vehicle width direction.

The under-cover attachment portion 43 is formed by the above-described respective walls 43*a*, 43*b*, 43*c* in a boxy shape which is opened forwardly and upwardly. Also, the bottom wall 43*c* of the under-cover attachment portion 43 becomes an attaching (mounting) seat for attaching an under cover 50 shown in FIGS. 10-13.

As shown in FIGS. 6C, 7 and 8, a notch 44 is formed at a base portion of the under-cover attachment portion 43. As shown in FIGS. 7 and 8, this notch 44 is formed such that a lower side of the above-described vertical face portion 31 is cutout partially, corresponding to an upper side between the pair of right-and-left side walls 43*a* of the under-cover attachment potion 43.

Thereby, since the notch 44 becomes a fragile portion, the body portion 33 is bent downwardly with a supporting point of the base portion, i.e., the root portion, of the body portion 33 because the notch 44 becomes a bending causing point. Thereby, a position where a tip-side part of the body portion 33 remains uncrushed is moved downwardly.

Herein, as shown in FIGS. 4 and 9, the protrusion face portion 35 is provided at a part of the vertical face portion 31, and comprises an upper wall 35*a* and right-and-left side walls 35*b*, 35*b* such that it is formed in a boxy shape. In other words, the protrusion face portion 35 is formed at the vertical face portion 31 via the upper wall 35*a* and the right-and-left side walls 35*b*, 35*b* such that it is forwardly spaced apart from the vertical face portion 31. As shown in FIGS. 7 and 8, a vehicle rearward side and a vehicle downward side of the protrusion portion 35 are opened.

Further, as shown in FIG. 6B, the protrusion face portion 35 comprises a protrusion-face-portion upper section 35U which is located at the higher level than an upper end of the front-end-portion upper section 34U and a protrusion-face-portion lower section 35L which is located at a lower level than an upper end of the front-end-portion upper section 34U.

In the present embodiment, as shown in FIG. 6B, the protrusion-face-portion lower section 35L is set at the same level, in the vehicle vertical direction, as the front-end-portion upper section 34U. The protrusion-face-portion lower section 35L is configured to have the lower strength against the collision load applied from the vehicle forward side than the protrusion-face-portion upper section 35U.

Specifically, as shown in FIGS. 6B, 7 and 8, plural ribs 45 extending in the vertical direction as a high-rigidity portion are arranged in an upper area of the above-described boxy shape (i.e., an area of the protrusion-face-portion upper section 35U), and a lower area of the boxy shape is configured to be a hollow 46.

Thereby, even if the front end portion 34 is retreated by the rearward load and the front-end-portion lower section 34L remains uncrushed partially, the front face of the beam member 24 is moved back just straightly by the protrusion-face-portion upper section 35U of the protrusion face portion 35 protruding forwardly, so that the beam member 24 is suppressed from being rotated.

Further, by arranging the vertical rib 45 in the upper area of the boxy shape and forming the hollow 46 in the lower area of the boxy shape, the protrusion-face-portion lower section 35L is configured such that it has the lower strength against the collision load applied from the vehicle forward side than the protrusion-face-portion upper section 35U with a simple structure.

As shown in FIGS. 7 and 8, the plural vertical ribs 45 are provided at intervals in the vehicle width direction. Further, the vertical ribs 45 extend downwardly from the upper wall 35*a* of the protrusion face portion 35 and supported by a lateral crosspiece 47 which extends laterally between the right-and-left side walls 35*b*, 35*b* at their lower portions.

As shown in FIG. 4, the protrusion face portion 35 is provided, in the vehicle width direction, at a location of the lower stiffener 30 which corresponds to an area between the border portion β between the central portion 27 and each of the both-end portions 28 of the beam member 24 and a position of an inward-side end portion, in the vehicle width direction, of the lower-side crash can 23. In the present embodiment, the protrusion face portion 35 is provided, in the vehicle width direction, at a location adjacent to the inward-side end position, in the vehicle width direction, of the lower-side crash can 23.

Thereby, since the protrusion face portion 35 hits against a barrier BRA earlier than the vertical face portion 31 when the barrier BRA intrudes in a collision mode determined by the MPDB collision test (see FIG. 9), the crushing is controllable.

As shown in FIGS. 4 and 9, a central portion, in the vehicle width direction, of the boxy shape of the protrusion face portion 35 protrudes forwardly as a central protrusion portion 35c. Thereby, in the vehicle frontal collision, the portion protruding forwardly (see the central protrusion portion 35c) previously hits against the barrier BAR (see FIG. 9), so that the front face of the protrusion face portion 35 is crushed substantially uniformly.

Meanwhile, as shown in FIGS. 6A-6C, the front end portion 34 comprises the front-end-portion upper section 34U which is located above the body portion 33 and the front-end-portion lower section 34L which is located below the body portion 33. The front-end-portion upper section 34U is positioned on the vehicle forward side of the front-end-portion lower section 34L and protrudes highly relative to the body portion 33.

Thereby, in the vehicle frontal collision, the upper end of the front end portion 34 is rotated such that its rear side is moved more downwardly, so that the body portion 33 is deflected downwardly. Consequently, the part of the front end portion 34 which remains uncrushed is moved below the vertical face portion 31.

Figure 10:
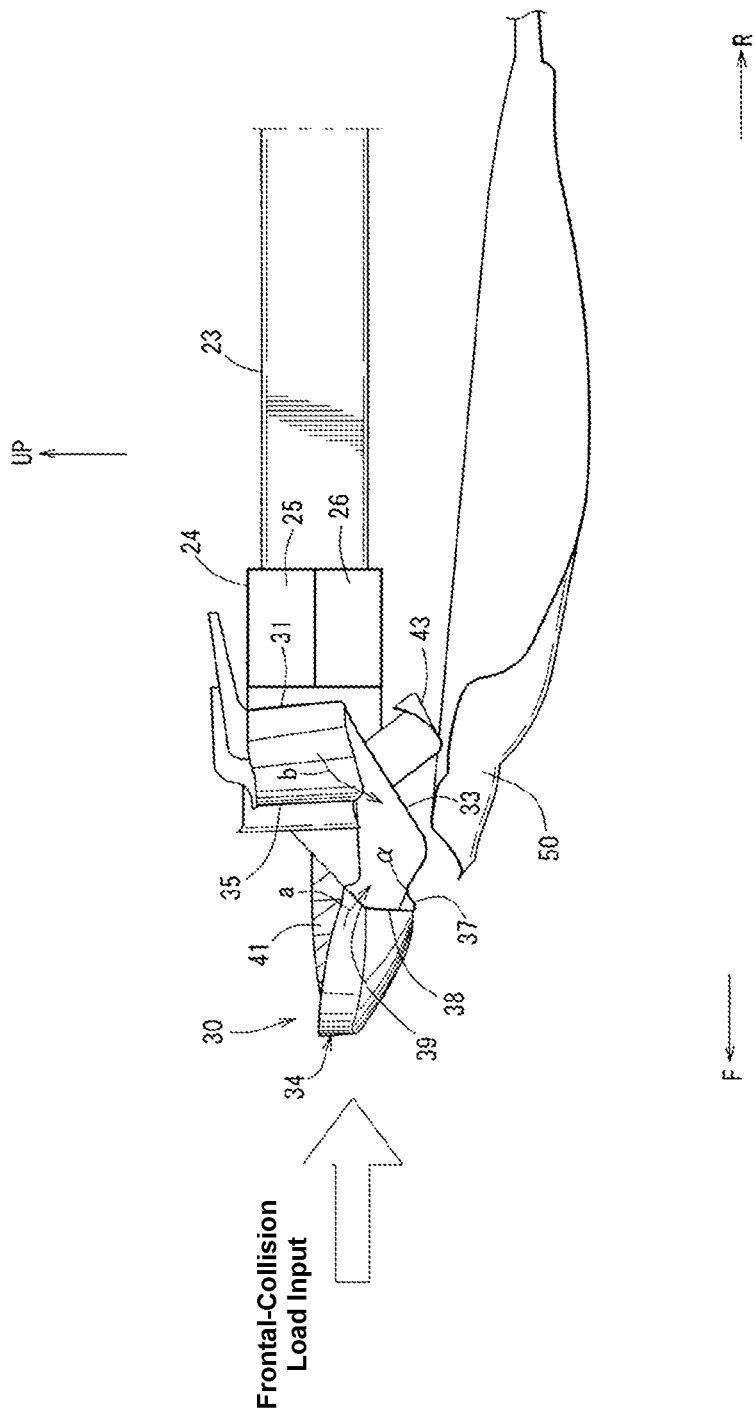
FIG. 10 is a schematic side view showing deformation at a first stage in a vehicle frontal collision.
Figure 11:
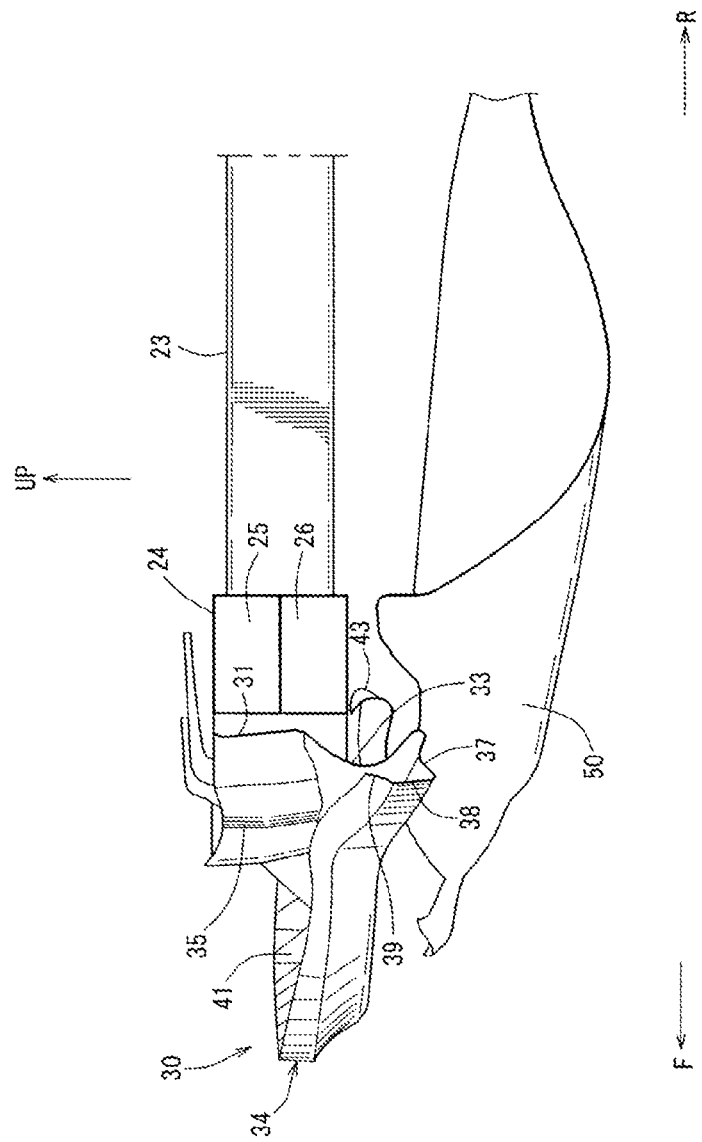
FIG. 11 is a schematic side view showing deformation at a second stage in the vehicle frontal collision.
Figure 12:
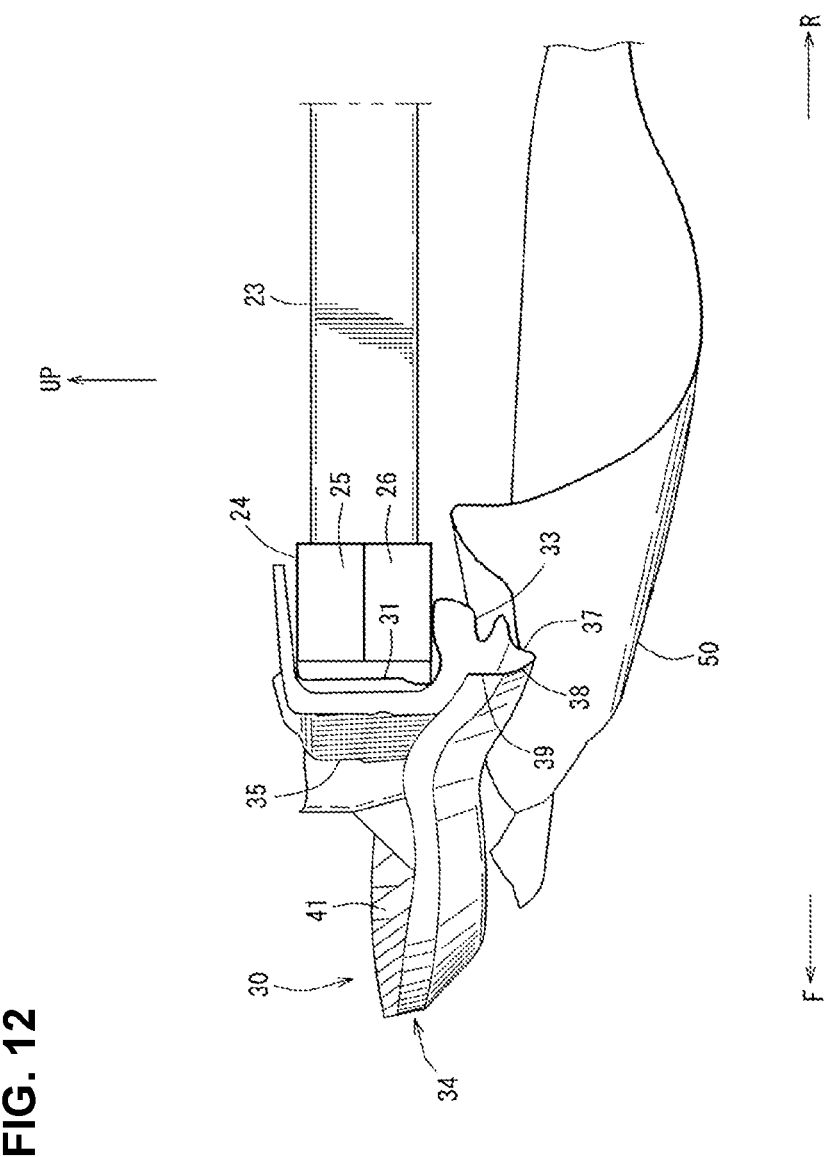
FIG. 12 is a schematic side view showing deformation at a third stage in the vehicle frontal collision.
Figure 13:
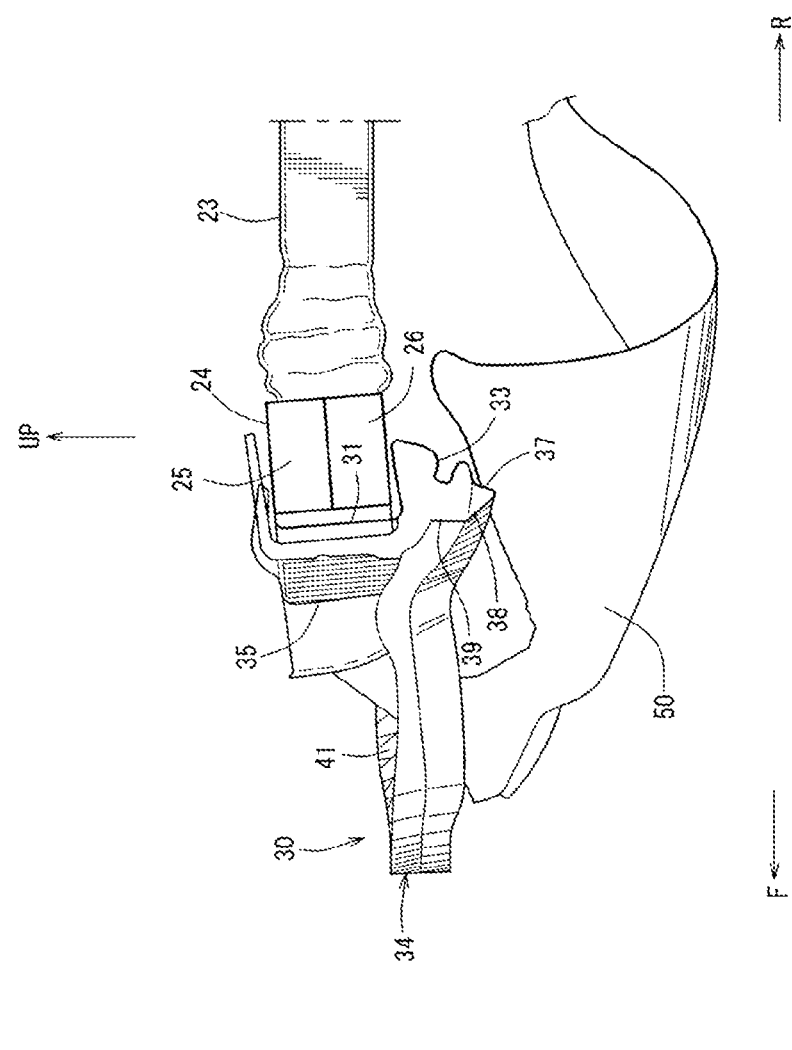
FIG. 13 is a schematic side view showing deformation at a fourth stage in the vehicle frontal collision.

FIG. 10 is a schematic side view showing deformation at a first stage in the vehicle frontal collision, FIG. 11 is a schematic side view showing deformation at a second stage in the vehicle frontal collision, FIG. 12 is a schematic side view showing deformation at a third stage in the vehicle frontal collision, and FIG. 13 is a schematic side view showing deformation at a fourth stage in the vehicle frontal collision. Hereafter, the respective deformations in the vehicle frontal collision will be described referring to FIGS. 10-13.

Deformation at First Stage Shown in FIG. 10

At the first stage of the vehicle frontal collision, the frontal-collision load is inputted to the front-end-portion upper section 34U earlier than the front-end-portion lower section 34L of the front end portion 34 of the lower stiffener 30, the upper end of the front end portion 34 is rotated with a support point of the border portion α such that its rear side is moved more downwardly as shown by an arrow a in FIG. 10, and this moment causes the body portion 33 to be deflected downwardly as shown by an arrow b in FIG. 10.

Deformation at Second Stage Shown in FIG. 11

Since the base portion of the body portion 33 of the lower stiffener 30 is configured to be fragile by forming the notch 44, at the second stage of the vehicle frontal collision, as shown in FIG. 11, the body portion 33 is bend downwardly with the support point of the base portion, i.e., the root portion, of the body portion 33, so that the position of the front end portion 34 which remains uncrushed is moved downwardly. Further, the under-cover attachment portion 43 is rotated rearwardly with the support point of the part where the notch 44 is formed so as not to hinder the downward move of the body portion 33.

Deformation at Third Stage Shown in FIG. 12

Since members (see the protrusion face portion 35 and the vertical ribs 45 of the upper section 35U) which are substantially equivalent to the uncrushed-remaining degree of the front end portion 34 of the lower stiffener 30 moving rearwardly is provided at the rear portion of the lower stiffener 30, at the third stage of the vehicle frontal collision, the uncrushed-remaining degree of the front-face side of the beam member 24 becomes substantially uniform as show in FIG. 12.

Deformation at Fourth Stage Shown in FIG. 13

The above-described uniformizing moves back the beam member 24 just straightly and axially compresses the lower-side crash can 23, thereby absorbing the collision energy properly.

In the drawings, an arrow F shows the vehicle forward side, an arrow R shows the vehicle rearward side, an arrow IN shows the inward side in the vehicle width direction, and an arrow OUT shows the outward side in the vehicle width direction, and an arrow UP shows the vehicle upward side.

As described above, the front structure of the vehicle according to the present embodiment comprises the beam member 24 positioned in front of the sub frame 14 and having the closed-cross sections 25, 26 extending in the vehicle width direction, and the plate member (the lower stiffener 30) extending forwardly from the beam member 24, wherein the plate member (the lower stiffener 30) comprises the vertical face portion 31 provided along the front face portion of the beam member 24, the body portion 33 extending forwardly from the vertical face portion 31, the front end portion 34 positioned at the front end of the body portion 33 and configured to have the higher rigidity against the load applied in the longitudinal direction than the body portion 33, and the protrusion face portion 35 provided to be forwardly spaced apart from the vertical face portion 31, the front end portion 34 of the plate member (the lower stiffener 30) comprises the front-end-portion upper section 34U located at the higher level than the body portion 33, the protrusion face portion 35 comprises the protrusion-face-portion upper section 35U located at the higher level than the upper end of the front-end-portion upper section 34U and the protrusion-face-portion lower section 35L located at the lower level than the upper end of the front-end-portion upper section 34U, and the protrusion-face-portion lower section 35L is configured to have the lower strength against the collision load applied from the vehicle forward side than the protrusion-face-portion upper section 45U (see FIGS. 1, 2 and 6A-6C)

According to this structure, even if the vehicle collides against the pedestrian from any direction, the front end portion 34 of the plate member transmits the collision load to the body portion 33 so as to allow the body portion 33 to be deformed with a constant load. Thereby, an appropriate reaction force can be generated.

Further, in the vehicle frontal collision, even if the front end portion 34 is retreated by the rearward load and the protrusion-face-portion lower section 35L remains uncrushed partially, since the protrusion-face-portion lower section 35L is configured to have the lower strength against the collision load applied from the vehicle forward side than the protrusion-face-portion upper section 35U, the protrusion-face-portion lower section 35L can be deformed rearwardly. Consequently, the front face of the beam member 24 is moved back just straightly because of an uncrushed-remaining structure of the front end portion 34 which is created between the protrusion-face-portion upper section 35U of the protrusion face portion 35 protruding forwardly and the protrusion-face-portion lower section 35L deformed rearwardly, so that the beam member 24 can be suppressed from being rotated.

That is, even if the plate member (the lower stiffener 30) is applied to the beam member 24 having the closed-cross sections 25, 26, the pedestrian-protection performance and the vehicle-parts damage suppression in the vehicle light collision can be compatibly attained.

Further, in the present embodiment, the protrusion face portion 35 is provided at a part of the vertical face portion 31 and comprises the upper wall 35*a* and the right-and-left side walls 35*b* such that the protrusion face portion 35 is formed in the boxy shape, and the high-rigidity portion (see the vertical ribs 45) is provided in the upper area of the boxy shape and the lower area of the boxy shape is configured to be the hollow 46 (see FIGS. 6A-6C and 8). According to this structure, a structure in which the protrusion-face-portion lower section 35L has the lower strength against the collision load applied from the vehicle forward side than the protrusion-face-portion upper section 35U can be materialized with a simple structure.

Moreover, in the present embodiment, the lower-side crash can 23 which is connected to the beam member 24 is provided in front of the sub frame 14, the beam member 24 comprises the central portion 27 which is positioned at the central side, in the vehicle width direction, of the beam member 24 and extends in the vehicle width direction and the both-end portions 28 which extend obliquely outwardly-and-rearwardly from the right-and-left both ends of the central portion 27 in the plan view, and the protrusion face portion 35 is provided between the border portion β between the central portion 27 and each of the both-end portions 28 and the position of the inward-side end portion, in the vehicle width direction, of the lower-side crash can 23 (see FIG. 4). According to this structure, since the protrusion face portion 35 hits against the barrier BAR earlier than the vertical face portion 31 when the barrier BAR intrudes, crushing control can be properly attained.

Also, in the present embodiment, the boxy shape of the protrusion face portion 35 is configured such that the center, in the vehicle width direction, thereof protrudes forwardly (see the central protrusion portion 35*c*) (see FIGS. 4 and 9). According to this structure, the forwardly-protrusion portion (see the central protrusion portion 35*c*) of the boxy shape hits against the barrier BAR first (see FIG. 9), so that the front face of the protrusion face portion 35 can be crushed substantially uniformly.

Additionally, in the present embodiment, the front end portion 34 comprises the front-end-portion upper section 34U located at the higher level than the body portion 33 and the front-end-portion lower section 34L which is located at the lower level than the body portion 33, and the front-end-portion upper section 34U is positioned on the vehicle forward side of the front-end-portion lower section 34L and protrude highly relative to the body portion 33 (see FIGS. 6A-6C).

According to this structure, the upper end of the front end portion 34 can be rotated such that its rear side is moved more downwardly in the vehicle frontal collision, so that the body portion 33 is so deflected downwardly that the part of the front end portion 34 which remains uncrushed can be moved below the vertical face portion 31.

Further, in the present embodiment, the ribs 41 which connect the front end of the front end portion 34 and the body portion 33 are provided (see FIGS. 6A-6C). According to this structure, the front end portion 34 can be made to have the high rigidity with a simple structure. The collision load can be properly received by this high-rigidity front end portion 34 in the pedestrian's protection.

In correspondence of the present invention to the above-described embodiment, the plate member of the present invention corresponds to the lower stiffener 30 of the embodiment. Likewise, the high-rigidity portion corresponds to the vertical rib 45. However, the present invention is not to be limited to the above-described embodiment but can be materialized in a various manners.

For example, while the engine-driven vehicle provided with the engine room is exemplified in the embodiment, the present invention is applicable to an electric vehicle provided with a motor room.

As described above, the present invention is useful for the front structure of the vehicle which comprises the beam member positioned in front of the sub frame and having the closed-cross section extending in the vehicle width direction and the plate member extending forwardly from the beam member.

What is claimed is:

1. A front structure of a vehicle, comprising:
   a beam member positioned in front of a sub frame and having a closed-cross section extending in a vehicle width direction; and
   a plate member extending forwardly from the beam member,
   wherein said plate member comprises a vertical face portion provided along a front face portion of said beam member, a body portion extending forwardly from said vertical face portion, a front end portion positioned at a front end of said body portion and configured to have higher rigidity against a load applied in a longitudinal direction than said body portion, and a protrusion face portion provided to be forwardly spaced apart from said vertical face portion,
   said front end portion of the plate member comprises a front-end-portion upper section located at a higher level than said body portion,
   said protrusion face portion comprises a protrusion-face-portion upper section located at a higher level than an upper end of said front-end-portion upper section and a protrusion-face-portion lower section located at a lower level than the upper end of said front-end-portion upper section, and
   said protrusion-face-portion lower section is configured to have lower strength against a collision load applied from a vehicle forward side than said protrusion-face-portion upper section.

2. The front structure of the vehicle of claim 1, wherein said protrusion-face-portion upper section of the plate member is provided at a part of said vertical face portion and comprises an upper wall and right-and-left side walls such that the protrusion face portion is formed in a boxy shape, and a high-rigidity portion is provided in an upper area of said boxy shape, and
   wherein the protrusion-face-portion lower section forms a lower area of the boxy shape which is configured to be a hollow.

3. The front structure of the vehicle of claim 2, wherein a lower-side crash can which is connected to said beam member is provided in front of the sub frame, said beam member comprises a central portion which is positioned at a central location, in the vehicle width direction, of the beam member and extends in the vehicle width direction and two end portions which extend obliquely outwardly-and-rearwardly from right-and-left ends of said central portion in a plan view, and said protrusion face portion of the plate member is provided between a border portion between the central portion and each of said both-end portions of the beam member and a position of an inward-side end portion, in the vehicle width direction, of said lower-side crash can.

4. The front structure of the vehicle of claim 3, wherein said boxy shape of the protrusion face portion is configured such that a center, in the vehicle width direction, thereof protrudes forwardly.

5. The front structure of the vehicle of claim 4, wherein said front end portion of the plate member comprises said front-end-portion upper section located at the higher level than the body portion and a front-end-portion lower section which is located at a lower level than said body portion, and said front-end-portion upper section is positioned on the vehicle forward side of said front-end-portion lower section and protrudes higher relative to the body portion.

6. The front structure of the vehicle of claim 5, wherein a rib which connects a front end of said front end portion and said body portion of the plate member is provided.

7. The front structure of the vehicle of claim 2, wherein said boxy shape of the protrusion face portion is configured such that a center, in the vehicle width direction, thereof protrudes forwardly.

8. The front structure of the vehicle of claim 2, wherein said front end portion of the plate member comprises said front-end-portion upper section located at the higher level than the body portion and a front-end-portion lower section which is located at a lower level than said body portion, and said front-end-portion upper section is positioned on the vehicle forward side of said front-end-portion lower section and protrudes higher relative to the body portion.

9. The front structure of the vehicle of claim 3, wherein said front end portion of the plate member comprises said front-end-portion upper section located at the higher level than the body portion and a front-end-portion lower section which is located at a lower level than said body portion, and said front-end-portion upper section is positioned on the vehicle forward side of said front-end-portion lower section and protrudes higher relative to the body portion.

10. The front structure of the vehicle of claim 2, wherein a rib which connects a front end of said front end portion and said body portion of the plate member is provided.

11. The front structure of the vehicle of claim 3, wherein a rib which connects a front end of said front end portion and said body portion of the plate member is provided.

12. The front structure of the vehicle of claim 4, wherein a rib which connects a front end of said front end portion and said body portion of the plate member is provided.

13. The front structure of the vehicle of claim 1, wherein a lower-side crash can which is connected to said beam member is provided in front of the sub frame, said beam member comprises a central portion which is positioned at a central location, in the vehicle width direction, of the beam member and extends in the vehicle width direction and two end portions which extend obliquely outwardly-and-rearwardly from right-and-left ends of said central portion in a plan view, and said protrusion face portion of the plate member is provided between a border portion between the central portion and each of said both-end portions of the beam member and a position of an inward-side end portion, in the vehicle width direction, of said lower-side crash can.

14. The front structure of the vehicle of claim 13, wherein said boxy shape of the protrusion face portion is configured such that a center, in the vehicle width direction, thereof protrudes forwardly.

15. The front structure of the vehicle of claim 13, wherein said front end portion of the plate member comprises said front-end-portion upper section located at the higher level than the body portion and a front-end-portion lower section which is located at a lower level than said body portion, and said front-end-portion upper section is positioned on the vehicle forward side of said front-end-portion lower section and protrudes higher relative to the body portion.

16. The front structure of the vehicle of claim 13, wherein a rib which connects a front end of said front end portion and said body portion of the plate member is provided.

17. The front structure of the vehicle of claim 1, wherein said front end portion of the plate member comprises said front-end-portion upper section located at the higher level than the body portion and a front-end-portion lower section which is located at a lower level than said body portion, and said front-end-portion upper section is positioned on the vehicle forward side of said front-end-portion lower section and protrudes higher relative to the body portion.

18. The front structure of the vehicle of claim 1, wherein a rib which connects a front end of said front end portion and said body portion of the plate member is provided.

* * * * *